Dec. 19, 1961 C. W. VASSAR 3,014,118

MOBILE PIPE-FORMING APPARATUS

Filed April 11, 1960 6 Sheets-Sheet 1

CLYDE W. VASSAR
*INVENTOR.*

*BY* Lyon & Lyon

ATTORNEYS

Dec. 19, 1961 C. W. VASSAR 3,014,118

MOBILE PIPE-FORMING APPARATUS

Filed April 11, 1960 6 Sheets-Sheet 2

CLYDE W. VASSER
*INVENTOR.*

BY Lyon & Lyon

ATTORNEYS

CLYDE W. VASSAR
*INVENTOR.*

*BY* Lyon & Lyon

ATTORNEYS

Dec. 19, 1961 C. W. VASSAR 3,014,118

MOBILE PIPE-FORMING APPARATUS

Filed April 11, 1960

6 Sheets-Sheet 4

CLYDE W. VASSAR
*INVENTOR.*

*BY* Lyon & Lyon

ATTORNEYS

Dec. 19, 1961 C. W. VASSAR 3,014,118

MOBILE PIPE-FORMING APPARATUS

Filed April 11, 1960

6 Sheets-Sheet 5

CLYDE W. VASSAR
*INVENTOR.*

BY Lyon & Lyon

ATTORNEYS

Dec. 19, 1961 C. W. VASSAR 3,014,118

MOBILE PIPE-FORMING APPARATUS

Filed April 11, 1960 6 Sheets-Sheet 6

CLYDE W. VASSAR
*INVENTOR.*

BY Lyon & Lyon

ATTORNEYS

United States Patent Office 3,014,118

Patented Dec. 19, 1961

3,014,118
MOBILE PIPE-FORMING APPARATUS

Clyde W. Vassar, Whittier, Calif., assignor to Mobile Pipe Corporation, Whittier, Calif., a corporation of California Filed Apr. 11, 1960, Ser. No. 21,389
7 Claims. (Cl. 219—59)

This invention relates to apparatus for making pipe and is particularly directed to a mobile device for making a continuous length of metal pipe from flat strip material, or "skelp."

The Wheeler Patent 1,954,160 discloses a mobile device carrying a series of forming rolls and a welding apparatus for the stated purpose of forming a pipe with a longitudinal butt joint, and a wrapping mechanism is provided to apply a protective coating to the completed pipe before it is discharged from the machine. In the device disclosed in this Wheeler patent, the forward motion of the device over the ground under propulsion by traction motors serves to move the various forming rolls of the mill and welder over a stationary metal strip to produce pipe. The pipe-forming rolls are not power driven for pulling the strip and pipe through the mill. Such a design, if constructed, would have very serious disadvantages in that the great difficulty would be encountered in shaping the flat strip into round form to produce the pipe, and the completed pipe extending from the machine would be placed under excessive tension forces.

It is the principal object of this invention to provide a mobile pipe making device which avoids the shortcomings of the apparatus disclosed in the Wheeler patent and which uses power driven rolls for progressively changing the shape of the flat strip to form it into continuous cylindrical pipe with a longitudinal welded seam. A related object is to provide such a mobile pipe mill in which traction power is supplied to one or more driving motors to propel the device over the ground while at the same time power is supplied to turn pipe forming rolls to drag metal strip or skelp through the machine to form it into pipe and to weld a longitudinal seam, together with speed adjustment means for accurate control of the relative speed of the traction motors and roll-driving motors.

Another object of this invention includes the provision of improved roll-forming apparatus in advance of the welding unit in order to maintain adjacent edges of the strip in optimum position as the edges pass through the welder to form a longitudinal seam. Another object is to provide a multiple unit mobile pipe making device in which a forward unit is self propelled by power generating apparatus carried on that unit, and wherein the pipe mill apparatus is carried on a following unit and receives power from the forward unit. Another object is to provide such a device wherein provision is made on a connecting device between the units for supporting a roll of flat metal strip or skelp from which the pipe is formed. Another object is to provide a mobile device for manufacturing pipe in a continuous length and having improved means for removal of welding flash from inside the pipe. A further object is to provide an improved form of Turk's head device on the rear portion of the pipe-making unit for directing the completed pipe in any desired angle, within limits, as the pipe leaves the rear end of the mobile unit.

Other and more detailed objects and advantages will appear hereinafter.

Figure 1:
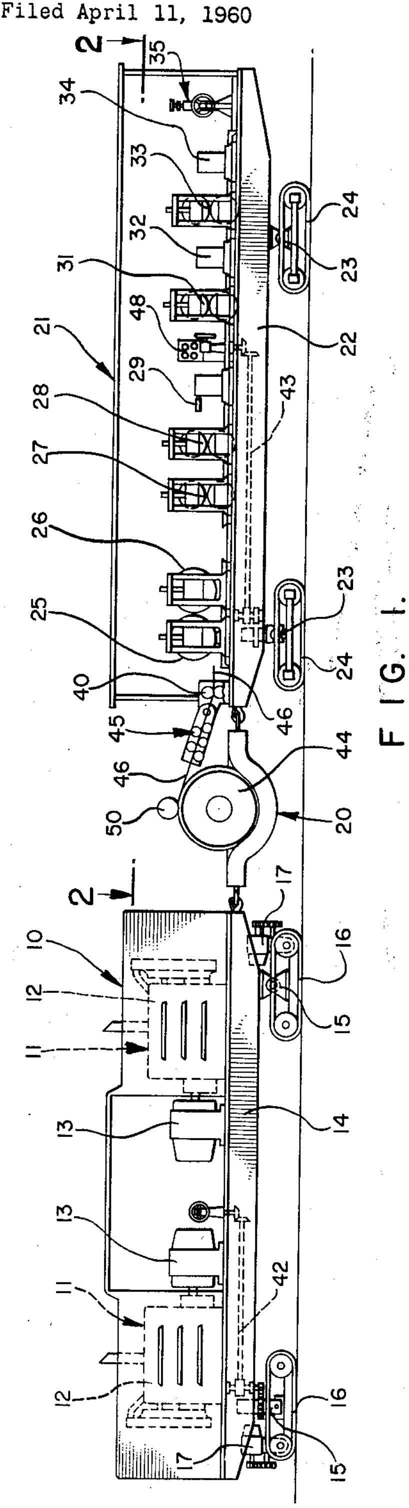
FIGURE 1 is a side elevation showing a preferred embodiment of this invention in diagrammatic form.
Figure 2:
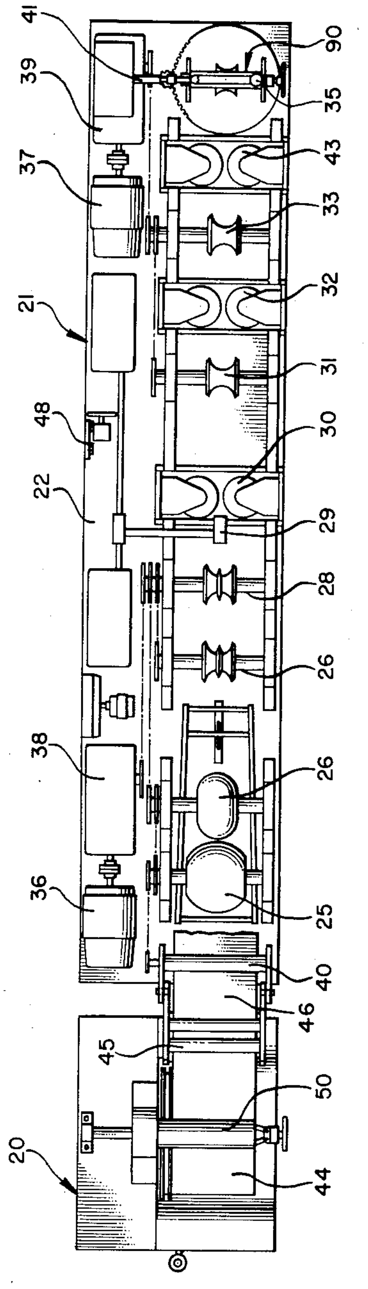
FIGURE 2 is a plan view of the pipe making unit.
Figure 3:
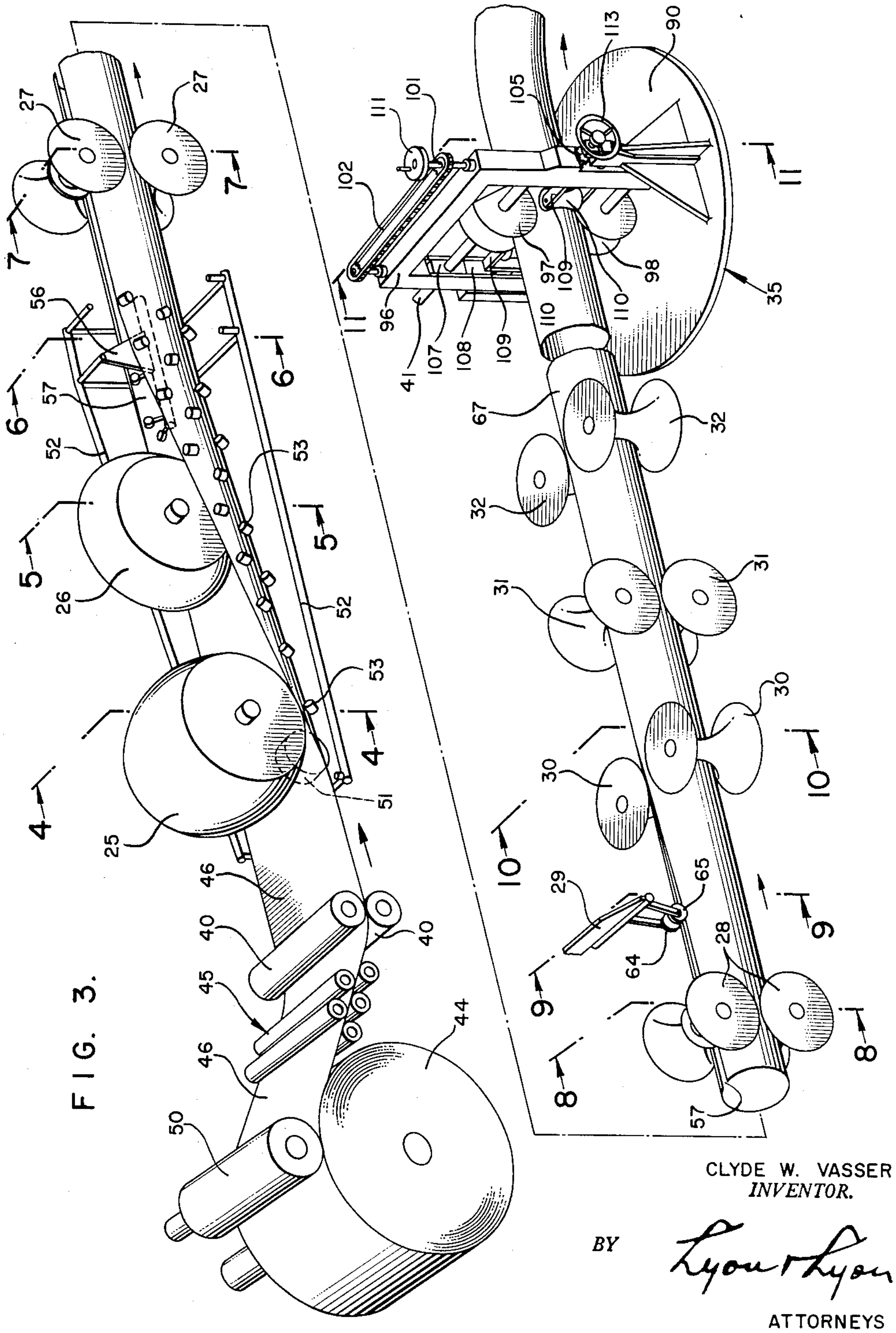
FIGURE 3 is a perspective view in diagrammatic form showing details of construction of the device shown in FIGURE 2.
Figures 4, 5, 6:
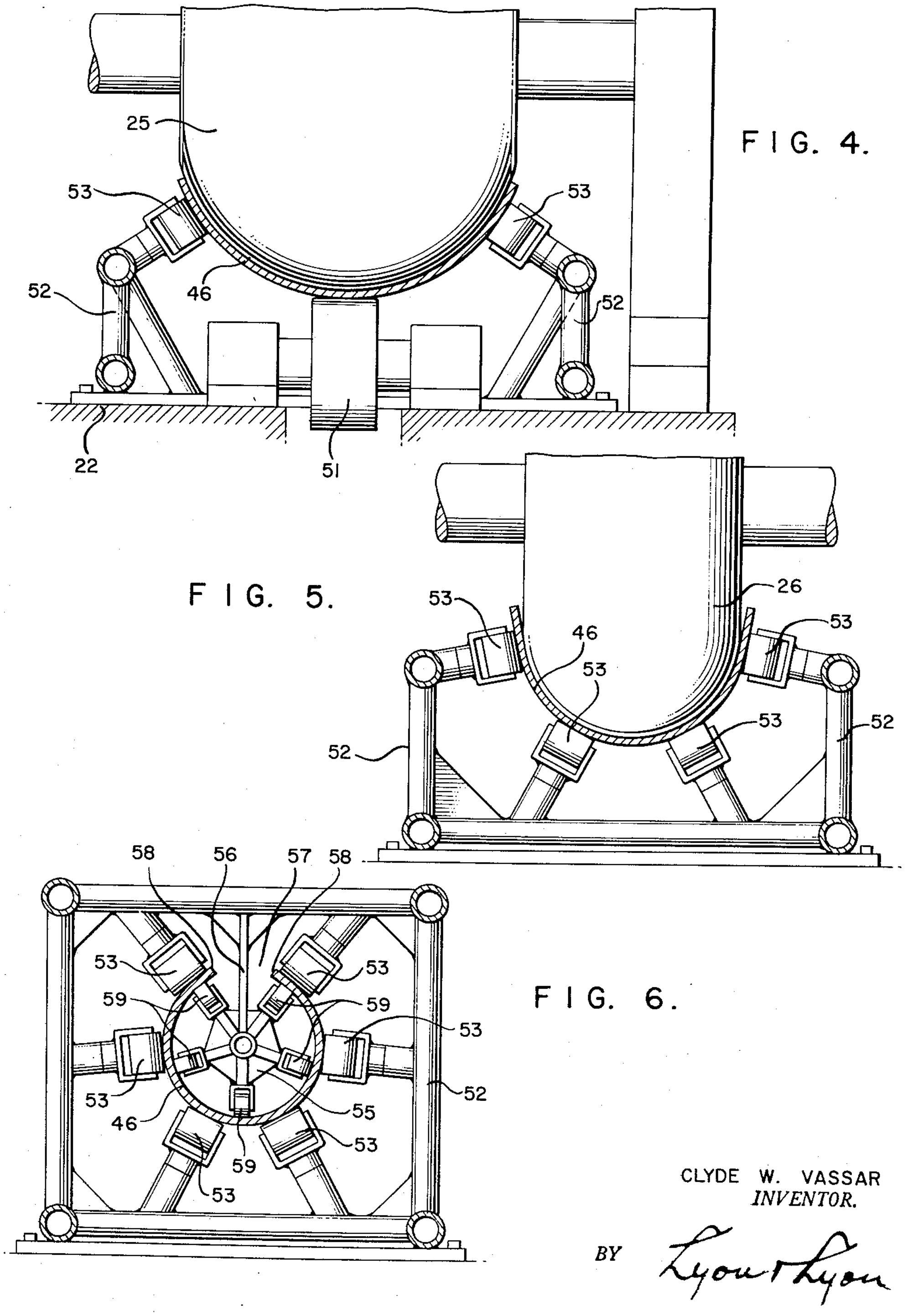

FIGURES 4, 5, and 6 are transverse sectional views taken substantially on lines 4—4, 5—5 and 6—6 as shown in FIGURE 3.

FIGURES 7, 8, 9 and 10 are transverse sectional elevations taken substantially on lines 7—7, 8—8, 9—9 and 10—10 as shown in FIGURE 3.

Figures 11, 12:
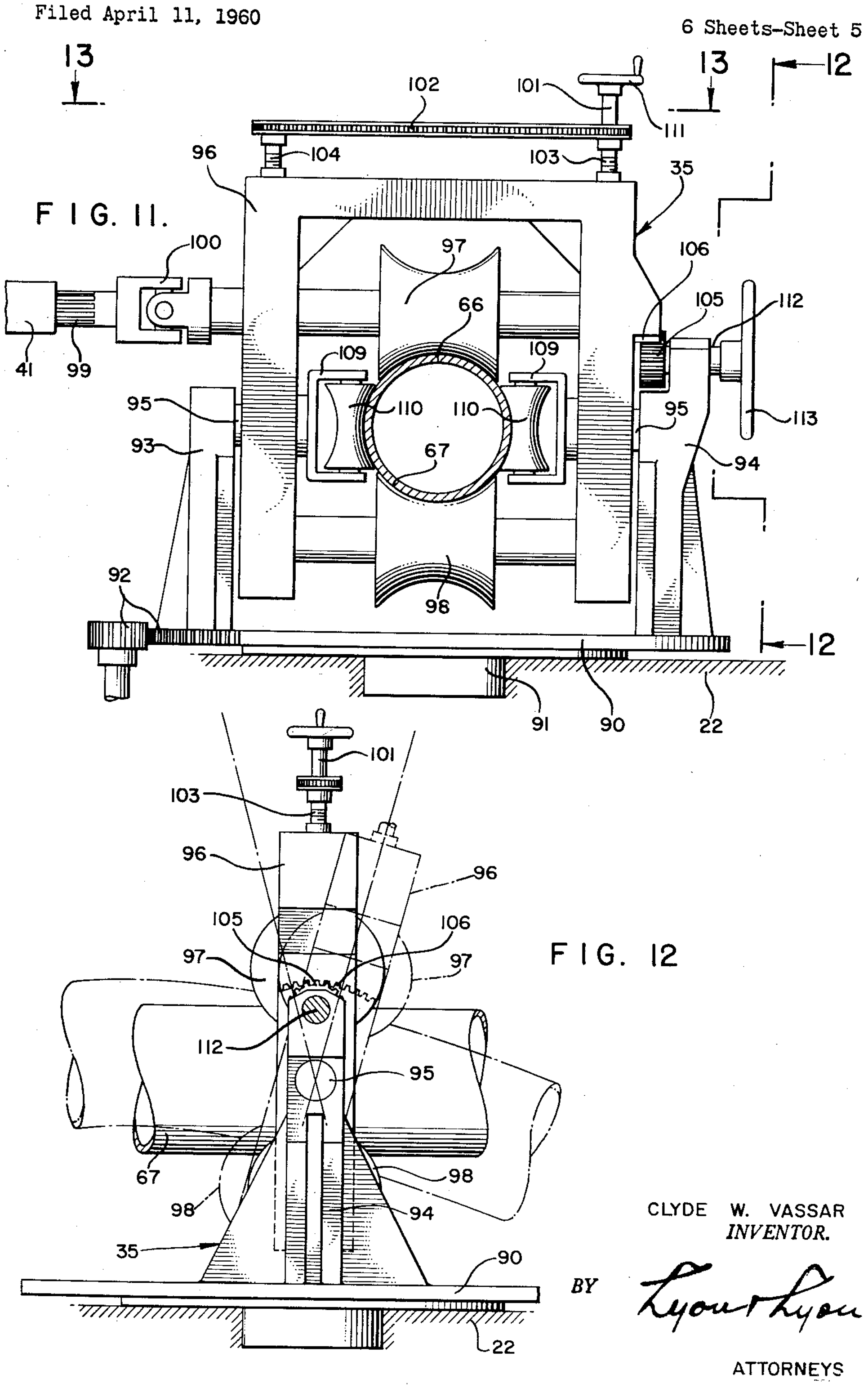

FIGURE 11 is a sectional elevation taken substantially on the lines 11—11 as shown in FIGURE 3, showing the "Turk's head."

FIGURE 12 is a side elevation taken substantially on the lines 12—12 as shown in FIGURE 11.

Figure 13:
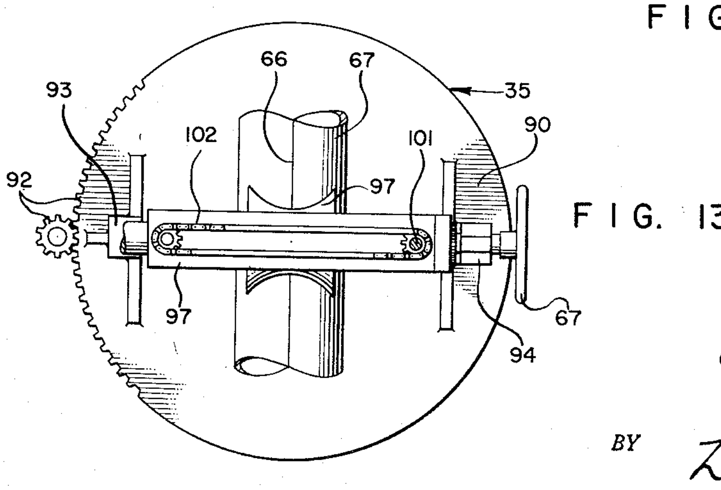

FIGURE 13 is a top plan view taken substantially on lines 13—13 as shown in FIGURE 11.

Figures 14, 15:
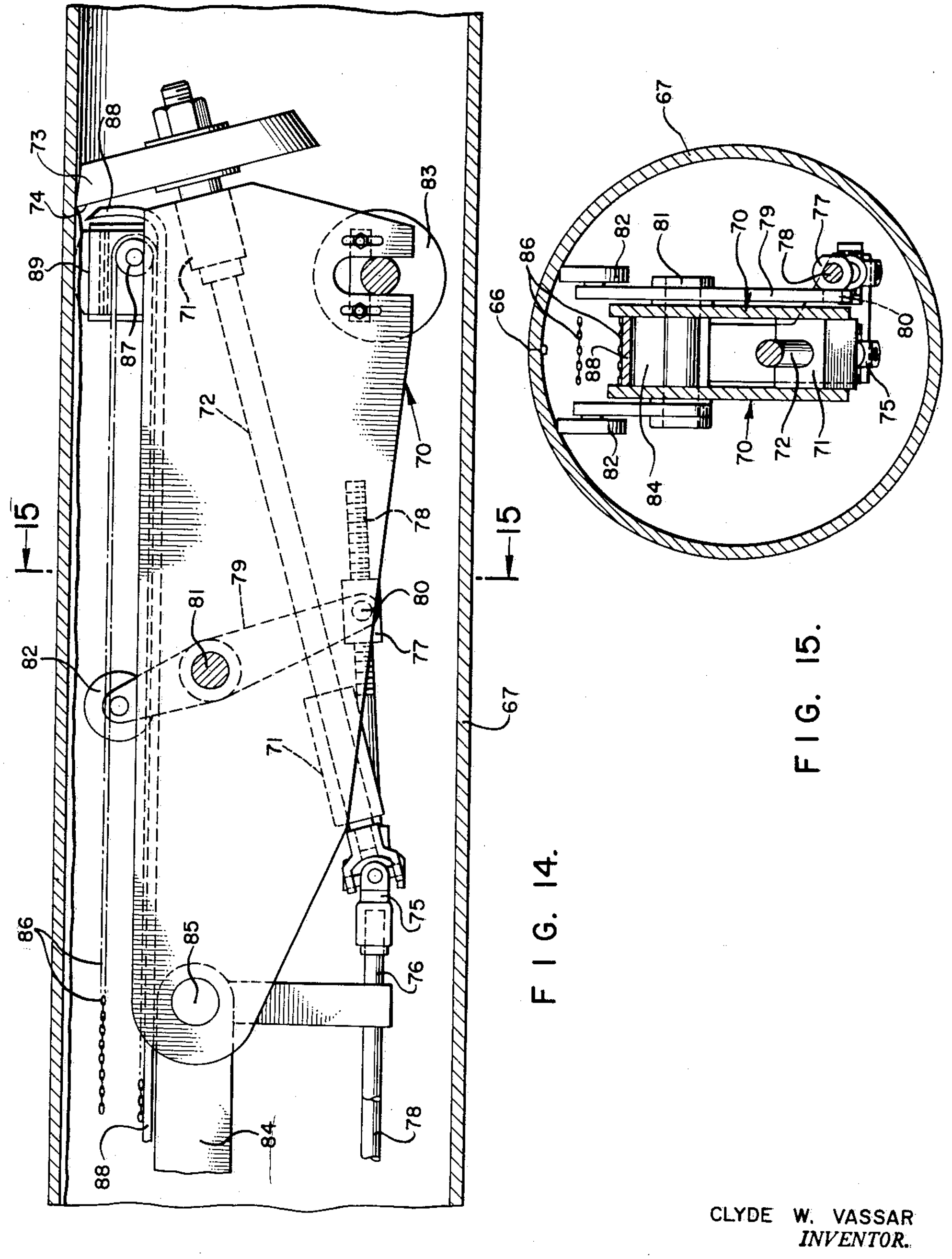

FIGURE 14 is a vertical section taken axially of the pipe at a location between the forging rolls and the sizing rolls of the inside flash from the longitudinal welded seam.

FIGURE 15 is a transverse sectional view taken substantially on the lines 15—15 as shown in FIGURE 14.

Referring to the drawings, the tractor unit generally designated 10 carries a plurality of electrical power generating units 11 and each of these may comprise an internal combustion engine 12 connected to drive an electric generator 13. The frame 14 is provided with supporting trucks 15 at its opposed ends and each of these may include endless track assemblies 16. Each of these endless track assemblies 16 is provided with a driving motor 17 to supply traction power and these motors receive electrical energy from one of the generators 13 through suitable electrical speed control equipment.

A coupling connector 20 connects the rear end of the tractor unit 10 to the front end of the trailer unit 21. This trailer unit includes a frame 22 having supporting trucks 23 provided with endless track assemblies 24. The trailer frame 22 supports the various components of a pipe mill including power-driven forming rolls 25 and 26, power-driven fins pass rolls 27 and 28, welding apparatus 29, sizing rolls 30, 31, 32, 33, 34 and Turk's head mechanism 35. Electric motors 36 and 37 receive power from electric generating apparatus 11 on the tractor unit 10 through suitable electrical speed control equipment. These motors 36 and 37 drive speed reduction devices 38 and 39 respectively. The device 38 is chain-connected to drive forming rolls 25 and 26, fin pass rolls 27 and 28, as well as the skelp feeding rolls 40. The speed reduction device 39 is chain-connected to drive sizing rolls 31 and 33 and also turns a shaft 41 for driving the Turk's head 35.

Suitable mechanism generally designated 42 and 43 is provided for steering the front trucks of each of the tractor and trailer units, 10 and 21. A supply roll 44 of flat metal strip or skelp is mounted on the connector 20 and passes through a straightening roll assembly 45 to the power-driven feed rolls 40. The skelp 46 then passes through forming rolls 25 and 26 and through fin pass aligning rolls 27 and 28 through the welder 29, then through sizing rolls 30, 31, 32, 33 and 34 and emerges as a continuous length of cylindrical pipe after passing through the Turk's head 35. In the general plan of operation, the tractor motors 17 drive the tractor 10 forward over the ground while the roll-driving motors 37 supply power to move the skelp 46 through the various roll and welding stations of the pipe mill assembly. Conventional speed control apparatus is provided for each of the motors 17, 36, 37 and these controls may be centralized at a convenient station, indicated at 48. The relative speeds of the traction motor 17 and roll driving motors 36 and 37 are carefully adjusted so that the speed of the pipe relative to the trailer 21 is the same as the speed of the trailer 21 with respect to the ground. A continuous length of pipe is thus formed and the maximum length thereof is equal to the length of skelp 46 on the supply roll 44.

If desired, traction motors similar to the motor 17 may be provided on the trucks 23 for trailer 21.

A roller 50 rests on the upper portion of the supply roll 44, and the skelp 46 after passing through the straightening roll assembly 45 passes through the power-driven feed rolls 40. As best shown in FIGURE 3, the skelp then passes under a large barrel-shaped forming roll 25 and then through a similar but narrower forming roll 26. The first convex roll 25 has a large transverse radius of curvature and the second convex roll 26 has a smaller transverse radius of curvature. A back-up roll 51 below the roll 25 is suitably mounted on a framework 52 and this framework carries a large number of small roller elements 53 which engage the opposite side of the skelp from that engaged by the large rolls 25 and 26. Each of these roller elements 53 is carried on the framework 52 as best shown in FIGURES 4, 5, and 6. These roller elements 53 cooperate with the large power driven rolls 25 and 26 to shape and control the transition of the flat skelp to the approximately cylindrical shape to which it is converted at the shaping rolls 27 and 28.

The framework 52 also supports an internal member 55 carried on a fin 56 which projects into the gap 57 between adjacent edges 58 of the skelp 46 (see FIGURE 6). This internal member 55 carries roller elements 59 which contact the inner surface of the skelp in the transition zone and assist in forming it to essentially cylindrical shape. The particular configuration of the framework 52 is shown only diagrammatically in the drawings for ease of illustration.

The improved apparatus for accomplishing the transition of the flat skelp 46 into a tubular member provides for support of the edges of the skelp and prevent them from springing back during the forming process and eliminates any sharp transitions common to other pipe-forming processes. The edges of the skelp are maintained in correct alignment as the formed skelp passes toward the welding apparatus 29.

Figure 7:
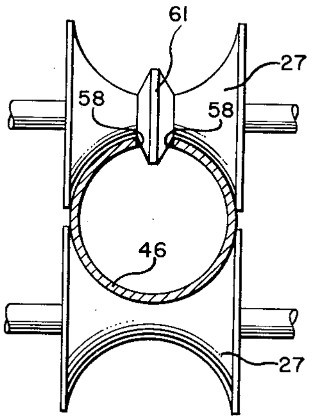
Figure 8:
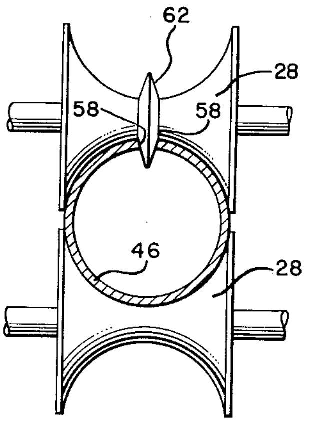
Figure 9:
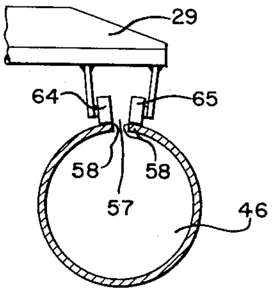
Figure 10:
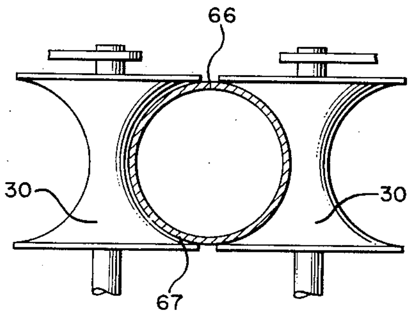

The power driven shaping rolls 27 and 28 each comprise a pair of cooperating concave rolls as clearly shown in FIGURES 7 and 8. The upper roll in each case is provided with a central circular disk or fin 61, 62. The circular fin 61 on the upper roll 27 is thicker than the circular fin 62 on the upper roll 28 and the cooperative effect of these rolls on the skelp material approaching the welder 29 is to cause the gap between the edges 58 to become progressively narrower.

The welder 29 may be of any suitable or desirable form and is only diagrammatically illustrated in the drawings. A high frequency welder is preferred but other types may be used if desired. In the particular form of welding apparatus shown in the drawings, electrical contact rollers 64 and 65 ride on the outer surface of the formed skelp 46 adjacent the edges 58 on opposite sides of the gap 57. The high frequency electrical energy imparted by the rollers to the metal skelp 46 heats the adjacent edges 58 to welding heat and produces a butt weld seam 66 where the edges 58 come together just in advance of the sizing rolls 30. The sidewise pressure applied by the rolls 30 produces a forge weld. At this stage the skelp 46 has been formed into pipe 67 having a longitudinal seam 66 and the pipe passes through additional sizing rolls 31, 32, 33 and 34 and then passes through the Turk's head 35.

The forging action of the rolls 30 on the edges 58 heated by the contact rollers 64 and 65 of the welder produces internal and external fins or "flash" along the longitudinal seam 66. The external flash is removed by conventional means, not shown, and the internal flash is removed by the apparatus shown in FIGURES 14 and 15 of the drawings. A carrier head 70 is proportioned to fit within the inside of the pipe 67 and carries spaced bearings 71 for the rotary shaft 72. A cutter 73 is fixed on the overhanging end of this shaft 72 and this cutter has an edge 74 which contacts the inner surface of the pipe 67 to remove the inside flash formed by the welding operation. The shaft 72 is driven through universal joint 75 and driving shaft 76 and then from a flexible shaft, not shown, which emerges from the pipe 67 in the region of the gap 57.

Means are provided for adjusting the position of the cutter 73 with respect to the inside surface of the pipe 67, and as shown in the drawings, this means includes a travelling nut 77 mounted on the adjusting screw 78. An arm 79 is pivoted at 80 to the nut 77 and is carried on a pivot pin 81 on the carrier head 70. The arm 79 is bifurcated and carries rollers 82 which are laterally spaced and which contact the inner surface of the pipe 67. Additional rollers 83 position the carrier head 70 within the pipe 67. An adjustable bumper 89 is provided on the carrier head 70 for contacting the inner surface of the pipe 67 on opposite sides of the internal flash fin. The proportions of the parts are such that rotation of the adjusting screw 78 causes pivotal movement of the arm 79 relative to the carrier head 70, and this serves to adjust the pressure of the cutter 73 against the inside surface of the pipe 67. A tension bar 84 is connected to the carrier head 70 at 85 and this bar is fixed to the stationary fin 56.

Means are provided for conveying flash material away from the cutter 73, and as shown in the drawings, this means comprises a conveyor chain 86 which passes around a pulley or sprocket 87 rotatably mounted on the carrier head 70. A stationary guide member 88 receives flash material removed by the cutter 73, and the lower flight of the conveyor chain acts as a drag to move the flash material along the surface of the guide 88 to a position where it can be removed through the gap 57. The chain conveyor 86 is driven by a motor and sprocket (not shown).

After the pipe 67 has passed through sizing rolls 34 it enters the Turk's head mechanism 35. This device includes a base plate 90 supported at 91 on the frame 22 for turning movement about a vertical axis. Such movement is accomplished by means of gearing 92. The base plate has a pair of upstanding posts 93 and 94 and these posts have axially aligned trunnions 95 which pivotally support the carrier 96. Cooperating concave rolls 97 and 98 are mounted on this carrier 96 and are shaped to contact the outer surface of the pipe 67. The upper roll is power driven from the shaft 41 through the splined connection 99 and universal joint 100. The elevation of the rolls 97 and 98 relative to the carrier 96 is controlled by means of the adjusting shaft 101 and chain 102 which connects the screws 103 and 104 for simultaneous rotation. Bearing blocks 107 and 108 are mounted to slide vertically on the carrier 96 and these blocks rotatably support the shafts of the rolls 97 and 98 as well as the yokes 109 for the guide rollers 110. The carrier 96 may be tilted about the axis of the aligned trunnions 95 by means of the pinion gear 105 and the gear segment 106 which meshes therewith. The pinion gear 105 is fixed on a stub shaft 112 rotatably mounted on the upstanding posts 93 and 94. A hand wheel 113 is also fixed on this stub shaft 112. Suitable locks (not shown) are provided for fixing the hand wheel 113 and gearing 92 in adjusted angular position.

From this description it will be understood that the Turk's head 35 may be turned about a vertical axis by means of the gearing 92 or turned about the horizontal axis of the aligned trunnions 95 by means of the gearing 105, 106. Moreover, the rolls 97 and 98 as well as the guide rollers 110 may be raised and lowered relative to the carrier 96 by means of the hand wheel 111 on shaft 101. Accordingly, the pipe 67 leaving the mobile mill may be caused to move in any angular direction, within the limits of adjustment of the Turk's head mechanism 35.

In operation, a supply roll 44 of skelp 46 is supported on the connector 20 between the tractor unit 10 and the trailer unit 21. Forward motion of the units 10 and 21 and connector 20 is controlled by the speed of the traction motors 17 on the tractor unit 10. Skelp 46 passes through the various rolls in the pipe-forming mechanism on the trailer unit 21 and the welder 29 forms a longitudinal seam in the pipe 57 thus produced. The pipe after welding passes through the sizing rolls and Turk's head 35 and emerges from the rear end of the trailer unit 10 as a continuous length of pipe.

Having fully described my invention, it is to be understood that I do not wish to be limited to the details set forth herein but my invention is of the full scope of the appended claims.

I claim:

1. Mobile pipe making apparatus, comprising in combination: a tractor carrying electric power generating apparatus, means including at least one traction motor for propelling the tractor, a trailer unit having pipe-forming apparatus supported thereon, the pipe-forming apparatus including transition rolls for shaping a metal strip into a cylindrical member and including at least one motor for driving said rolls, and means for driving said motors from said power generating apparatus and for adjusting the relative speeds of the traction motor and roll driving motor.

2. Mobile pipe making apparatus, comprising in combination: a tractor carrying electric power generating apparatus, means including at least one traction motor for propelling the tractor, a trailer unit having pipe-forming apparatus supported thereon, the pipe-forming apparatus including transition rolls for shaping a metal strip into a cylindrical member and including at least one motor for driving said rolls, said pipe-forming apparatus also including a welding device for joining edges of the shaped strip to form a continuous pipe, and means for driving said motors from said power generating apparatus and for adjusting the relative speeds of the traction motor and roll driving motor.

3. Mobile pipe making apparatus, comprising in combination: a tractor carrying electric power generating apparatus, means including at least one traction motor for propelling the tractor, a trailer unit having pipe-forming apparatus supported thereon, a connector device connecting the tractor unit to the trailer unit, the connector device being adapted to support a roll of skelp, the pipe-forming apparatus including transition rolls for shaping the skelp into a cylindrical member and including at least one motor for driving said rolls, said pipe-forming apparatus also including a welding device for joining edges of the shaped skelp to form a continuous pipe, and means for driving said motors from said power generating apparatus and for adjusting the relative speeds of the traction motor and roll driving motor.

4. Mobile pipe making apparatus, comprising in combination: a frame, means including transition rolls on the frame for shaping a metal strip into a cylindrical member, said means including at least one motor for driving said rolls, at least one traction motor connected to propel the frame, and means for adjusting the relative speeds of the traction motor and roll driving motor.

5. In a mobile pipe mill, the combination of: a frame, pipe forming apparatus for shaping skelp to form a welded tubular member, means on said frame for discharging said member in any angular direction as it leaves the frame, said means including a base mounted on the frame to turn about a certain axis, a carrier pivotally mounted on said base to turn about an axis normal to the first said axis, and rollers mounted on said carrier contacting the outer surface of said member.

6. In a mobile pipe mill, the combination of: a frame, pipe forming apparatus for shaping skelp to form a welded tubular member, means on said frame for discharging said member in any angular direction as it leaves the frame, said means including a base mounted on the frame to turn about a vertical axis, a carrier pivotally mounted on said base to turn about a horizontal axis, and rollers mounted on said carrier contacting the outer surface of said member.

7. In a mobile pipe mill, the combination of: a frame, pipe forming apparatus for shaping skelp to form a welded tubular member, means on said frame for discharging said member in any angular direction as it leaves the frame, said means including a base mounted on the frame to turn about a vertical axis, a carrier pivotally mounted on said base to turn about a horizontal axis, a pair of cooperating concave rollers shaped to contact the outer surface of said member, and means for simultaneously changing the position of both rollers with respect to said horizontal axis.

References Cited in the file of this patent

UNITED STATES PATENTS

| | | |
|---|---|---|
| 1,954,160 | Wheeler | Apr. 10, 1934 |
| 1,994,111 | Rocchi | Mar. 12, 1935 |
| 2,009,884 | Free | July 30, 1935 |
| 2,025,421 | Rippel | Dec. 24, 1935 |